(No Model.)
W. B. SMITH.
KNOB ATTACHMENT.
No. 332,455. Patented Dec. 15, 1885.
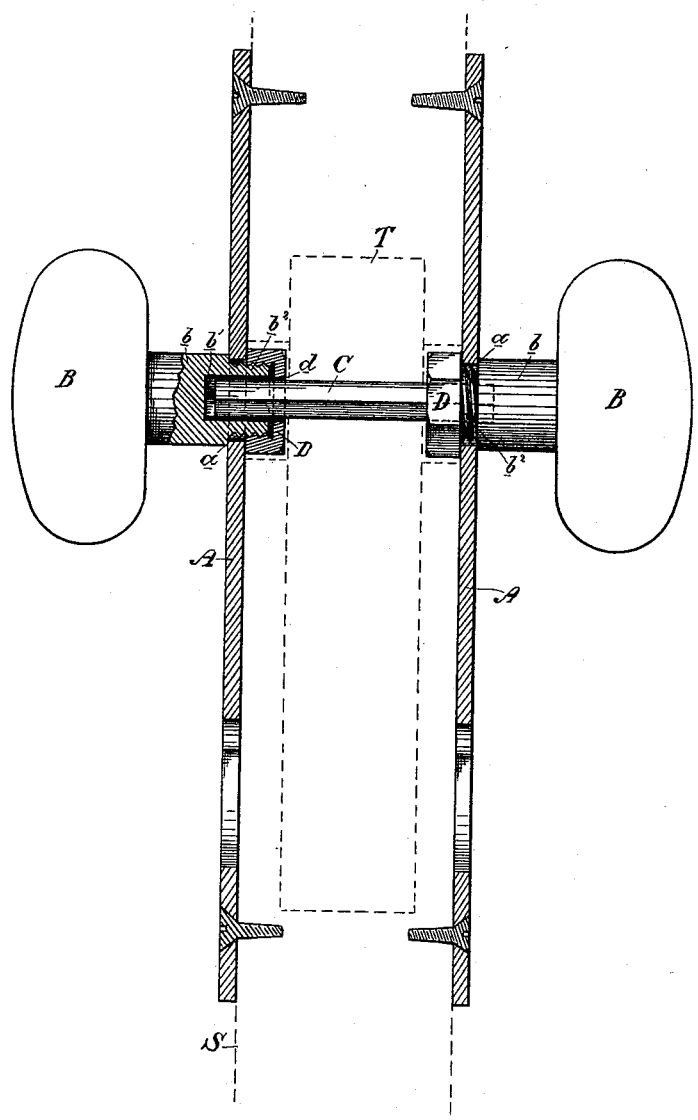
Witnesses,
Geo. H. Strong.
Inventor,
Wm. B. Smith
By Dewey & Co
Attorneys

UNITED STATES PATENT OFFICE.

WILLIAM B. SMITH, OF SAN FRANCISCO, CALIFORNIA.

KNOB ATTACHMENT.

SPECIFICATION forming part of Letters Patent No. 332,455, dated December 15, 1885.

Application filed April 16, 1885. Serial No. 162,503. (No model.)

*To all whom it may concern:*

Be it known that I, WILLIAM B. SMITH, of the city and county of San Francisco, and State of California, have invented an Improvement in Knob Attachments; and I hereby declare the following to be a full, clear, and exact description thereof.

My invention relates to new and useful devices for attaching door-knobs; and my invention consists in a square-socketed nut screwed upon a turned-down and inwardly-projecting threaded end of the knob-shank, behind the escutcheon or rose plate, said nut receiving the square spindle as it enters the square-socketed shank of the knob, as I shall hereinafter fully describe.

The old style of locks have a spindle which passes through the lock and extends on each side. Its ends fit within the hollow shanks of the knobs, and are secured by means of small screws. The objection to this form of attachment is that the screws have a tendency to work loose in their seats, and thus to allow the knobs an undesirable play, and, finally, to allow them to be pulled off.

Another way of attaching the knobs consists in doing away with the independent spindle and extending the shank of the knob inwardly to engage its inner end with the lock-plate by means of small hooks. The objection to this manner of attaching is that all the strain is brought upon the lock-plate.

The object of my invention is, that while employing the independent spindle, I make such a connection between it and the knobs as will permit the ready application or removal of the latter; and, also, I make a connection between the knobs and the escutcheon or rose plate in such a manner that all the strain is brought directly upon and is borne by the said escutcheon or rose plate.

Referring to the accompanying drawing, the figure is a vertical section through the escutcheon-plate.

The door S and the mortise-lock T are here shown in dotted lines, in order the better to to see the features of my invention.

A is the escutcheon or rose plate, which is of a customary pattern, longer than the old-style plates, and carrying the key-hole and the knob-hole in itself, which does away with the ordinary circular rose and the usual small and independent escutcheon-plate of the key-hole. This escutcheon A has therefore considerable strength, and is secured to the door by screws in the top and bottom in the usual manner. It is provided with a perfectly round hole, $a$, near its upper end.

B is the knob, having a shank, $b$, provided with a square hole or socket, $b'$, adapted to receive the latch-actuating spindle C, which is made of a short piece of square bar-iron. The end $b^2$ of the knob-shank is turned down, and is externally threaded, as shown. The knob-shank is fitted in the hole $a$ of the escutcheon until the shoulder of the turned-down portion abuts against the rim of said hole. When thus inserted in the escutcheon-plate, the turned-down portion $b^2$ projects inwardly behind it, and receives a nut, D, which is screwed upon it, thereby preventing the knob from being removed. The nut D is provided with a square hole, $d$. The spindle C fits through the nut and into the square socket of the knob-shank. When in this position, it is obvious that the nut cannot unscrew, because of its square hole receiving the spindle, and the spindle itself being seated in the square-socketed knob-shank. This forms a connection between the spindle and the knob, and these two parts may be readily engaged and disengaged by simply slipping one upon the other. By reason of the nut behind the escutcheon-plate the strain of the knob is borne entirely by said plate.

In attaching the knob, the shank $b$ is first passed through the hole $a$ in the escutcheon-plate while said plate is free from the door. The nut D is then screwed upon the threaded end of the knob-shank behind the escutcheon-plate, thereby securing the knob to the plate. The spindle C, being in its seat in the lock, receives upon each end the square-socketed nut D and the square-socketed shank of the knob, which are slipped thereon. This brings the escutcheon-plate to its place on the door, to which it is then secured by screws, thereby holding all the parts together.

To remove the knob, the escutcheon-plate must first be released from the door, when the knob and its nut may be slipped off from the spindle.

Having thus described my invention, what I claim as new, and desire to secure by Letters Patent, is—

The combination, with a door-knob having a shank with a reduced threaded end and an actuating-spindle, of an escutcheon or rose plate adapted to receive the reduced end of the knob-shank, and an internally-threaded nut adapted to be screwed upon the threaded end of said shank, whereby the knob is secured upon the escutcheon previous to the adjustment of the latter upon the door, substantially as herein described.

In witness whereof I have hereunto set my hand.

WILLIAM B. SMITH.

Witnesses:
S. H. NOURSE,
H. C. LEE.